H. M. MASON.
AUTOMOBILE GASOLENE LOCK.
APPLICATION FILED JUNE 17, 1920.
1,388,280.
Patented Aug. 23, 1921.
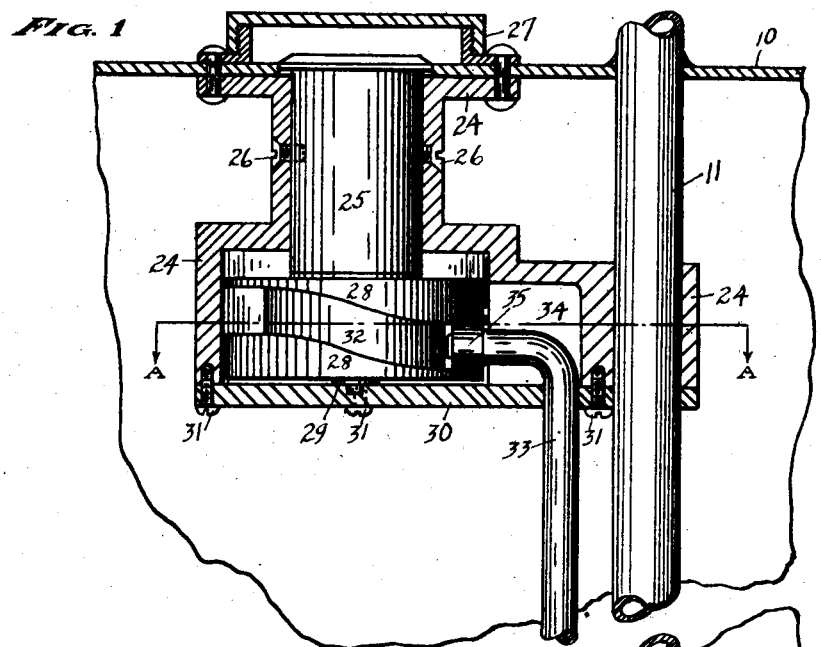
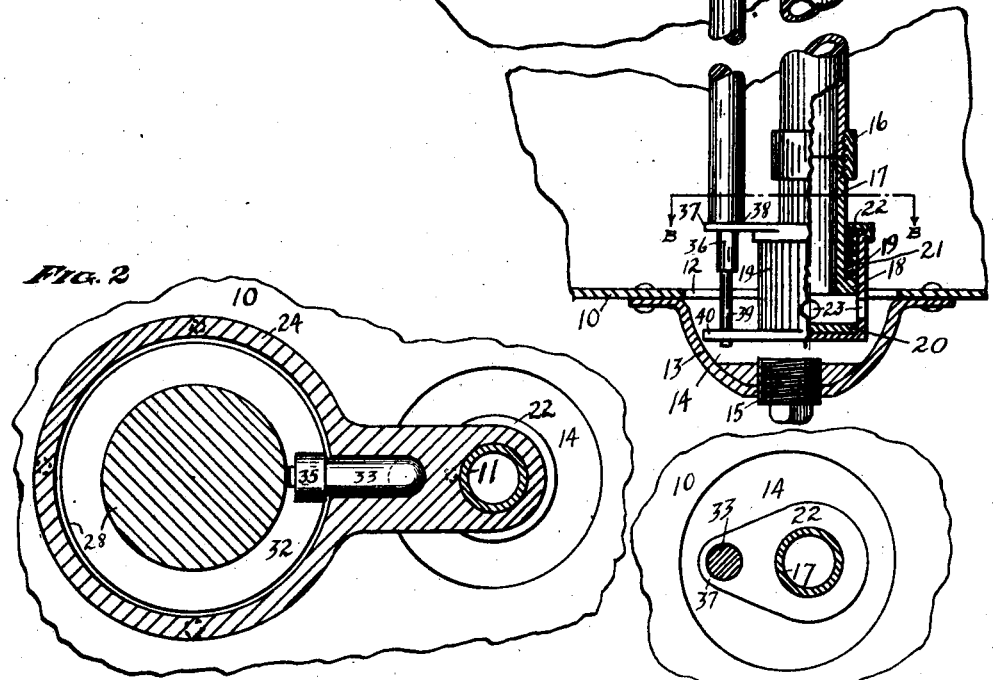
WITNESS:
Wm C Edwards Jr.
INVENTOR
Hal M. Mason
BY
U. G. Charles
ATTORNEY

UNITED STATES PATENT OFFICE.

HAL M. MASON, OF INDEPENDENCE, KANSAS.

AUTOMOBILE GASOLENE-LOCK.

1,388,280.

Specification of Letters Patent.  Patented Aug. 23, 1921.

Application filed June 17, 1920. Serial No. 389,682.

*To all whom it may concern:*

Be it known that I, HAL M. MASON, a citizen of the United States, residing at Independence, in the county of Montgomery and State of Kansas, have invented certain new and useful Improvements in Automobile Gasolene-Locks, of which the following is a description, referring to the drawings accompanying this specification.

The invention has for its object to provide a means whereby the flowline leading from the gasolene tank supply to the carbureter of an automobile may be easily cut off and being locked in this position prevent a possible theft of the car or unauthorized use thereof, since the fuel for engine operation is secured and rendered inaccessible for such purposes.

In the drawings, Figure 1 represents a fragmentary section of the gasolene tank of an automobile and shows the features of the invention as embodied therewith; portions being in section for a clearer understanding of the construction and operation of the mechanism. Fig. 2 represents a sectional view taken along the line A—A Fig. 1 and looking in the direction of the arrows. Fig. 3 represents a sectional view taken along the line B—B in Fig. 1 and looking in the direction of the arrows. Similar numerals of reference indicate corresponding parts throughout the drawings.

Referring to the drawings, in Fig. 1, 10 represents the gasolene tank; 11 is the flowline pipe leading from the tank toward the carbureter. It will be understood that my invention is applicable both to tanks under gravity and pressure feeds; but, for convenience of illustration and description that the section shown in Fig. 1 is a vertical section. A case 13 is rigidly attached to the tank beneath a cut away portion 12 thereof to provide a cup shaped depression 14 within which gasolene will always accumulate as long as any supply remains in the tank. A plug 15 in the case 13 permits of drainage when desired.

A threaded union 16 connects the base of the pipe 11 with a pipe extension 17, provided at its outer end with a flange 18. A cap 19 is passed upwardly over the flange 18 of the extension 17. In the bottom of the cap 19 is a disk 20, preferably of cork or fiber. Mounted upon the flange 18 is a coiled compression spring 21, normally tending to raise the cap 19 by pressure acting against the collar 22 screwed down upon the upper portion of the cap 19.

In the position of the parts previously described and as illustrated in Fig. 1 gasolene in the tank or in the case 13 can freely pass through the port holes 23 in the sides of the cap 19 and enter the base of the extension 17 and pass upwardly through the pipe 11 to the carbureter. This open condition is maintained by locking methods later described in detail, which upon being released permit the spring 21 to force the cap 19 to rise and the disk to seat against the end of the extension 17, thereby sealing same against exit of the gasolene when it is desired to prevent same from being unlawfully used.

Rigidly supported from the top of the tank 10 is a housing 24 and through which the pipe 11 preferably passes to make it more rigid with respect to the allied mechanisms of the invention. At 25, within the housing 24, is an ordinary cylinder lock, being held in place by screws 26 as illustrated. A cap 27 is shown screwed over the exterior of the lock to make it dirt and water proof. A cylinder 28, arranged within the enlarged base of the housing and against the base of the cylinder lock 25, is adapted to be revolved by the insertion of the proper key and the turning of the locking mechanism as will be readily understood. This cylinder 28 revolves on a bearing 29 arranged on the cover plate 30 secured to the base of the housing 24 by screws 31. The periphery of this cylinder 28 is grooved, as illustrated at 32. A shaft 33 housed in the plate 30 and arranged in parallelism with the pipe 11, has its upper end bent at right angles and located within a vertical compartment 34 in the housing 24. A roller 35 is mounted upon the upper end of the shaft 33 and is adapted to travel in the spiral slot 32 of the cylinder 28. The lower end of the shaft 33 is smaller in diameter at 36 and passes through an extension 37 of the collar 22 and against which the shoulder 38, thus provided on the shaft 33, bears. The extreme end 39 of the shaft 33 is still further reduced in diameter and passes through an extension 40 of the cap 19.

The open condition of the flowline previously described is being maintained against the spring pressure 21 by the pressure exerted against the extension 37 by the shoulder 38 of the shaft 33 which has been forced downwardly in the vertical compartment 34 of the housing as the key in the lock has turned the cylinder 28 forcing the roller 35 to travel in the groove 32 downwardly, to accomplish this purpose. It now being desired to lock the flow line, the key will be inserted in the lock and the cylinder 28 turned to raise the roller 35 by means of its travel in the spiral groove 32, thus raising the shaft 33 in the compartment 34 and releasing the pressure of the shoulder 38 on the extension 37; whereupon the spring 21 acts to raise the cap 19 and close the disk 20 against the pipe extension 17 as previously explained. The key now being removed from the lock, unauthorized use of the automobile is positively prevented.

Such modifications may be employed as lie within the scope of the appended claims.

Having fully described my invention what I now claim as new and desire to secure by Letters Patent is:

1. In combination, a gasolene tank, a pipe leading therefrom, a flanged extension upon the base of said pipe within the tank, a cap sleeved upon said flanged extension, a collar around said extension engaging said cap, a spring bearing between said collar and flange; openings in the sides of said cap adapted under certain conditions to admit gasolene for transmittal through said pipe, said spring normally tending to raise said cap to seat against the extension and close the orifices leading to said pipe against such gasolene transmittal.

2. In combination, a gasolene tank, a housing rigidly attached to the wall thereof within the tank, a cylinder lock within said housing and key operatable from without the tank; a cylinder included in said housing and having a spiral groove in the periphery thereof, said cylinder being rotatably under key control through said lock; a shaft carrying a roller as an end housed within said groove; a pipe leading from said tank, means for opening and closing said pipe within the tank, said means engaging with said shaft and operatable under key control of said lock as it rotates said spirally grooved cylinder to raise and lower said shaft for the purposes specified.

3. In combination, a gasolene tank, a housing rigidly attached to the inner wall thereof, a cylinder lock within the housing and key operatable from without the tank; a cylinder rotatably mounted in said housing under key control through said lock, a spiral groove in the periphery of said cylinder; a pipe leading from said tank, the inner end of said pipe passing through said housing within the tank, a flanged extension on said pipe, a cap sleeved thereon, a collar around said extension engaging said cap, a spring bearing between said collar and flange; openings in the sides of said cap adapted under certain conditions to admit gasolene from the tank for transmittal outwardly through said pipe; said spring normally tending to raise said cap to seat against and seal the orifice leading to said pipe against such gasolene transmittal; a shaft engaging portions carried by the cap, a roller on said shaft engaging within the groove of said cylinder whereby under key operation, the grooved cylinder will occasion desired movements of said shaft adapted to move said cap and open the passages leading into said pipe against such spring pressure and by reverse movements assist and permit said spring to seat said cap against said pipe for the purposes as specified.

HAL M. MASON.

Witnesses:
ALICE GETMAN,
PEARL LONDUY.